Feb. 18, 1947. J. J. REYNOLDS 2,416,220
NIPPLE CHUCK
Filed Feb. 15, 1946
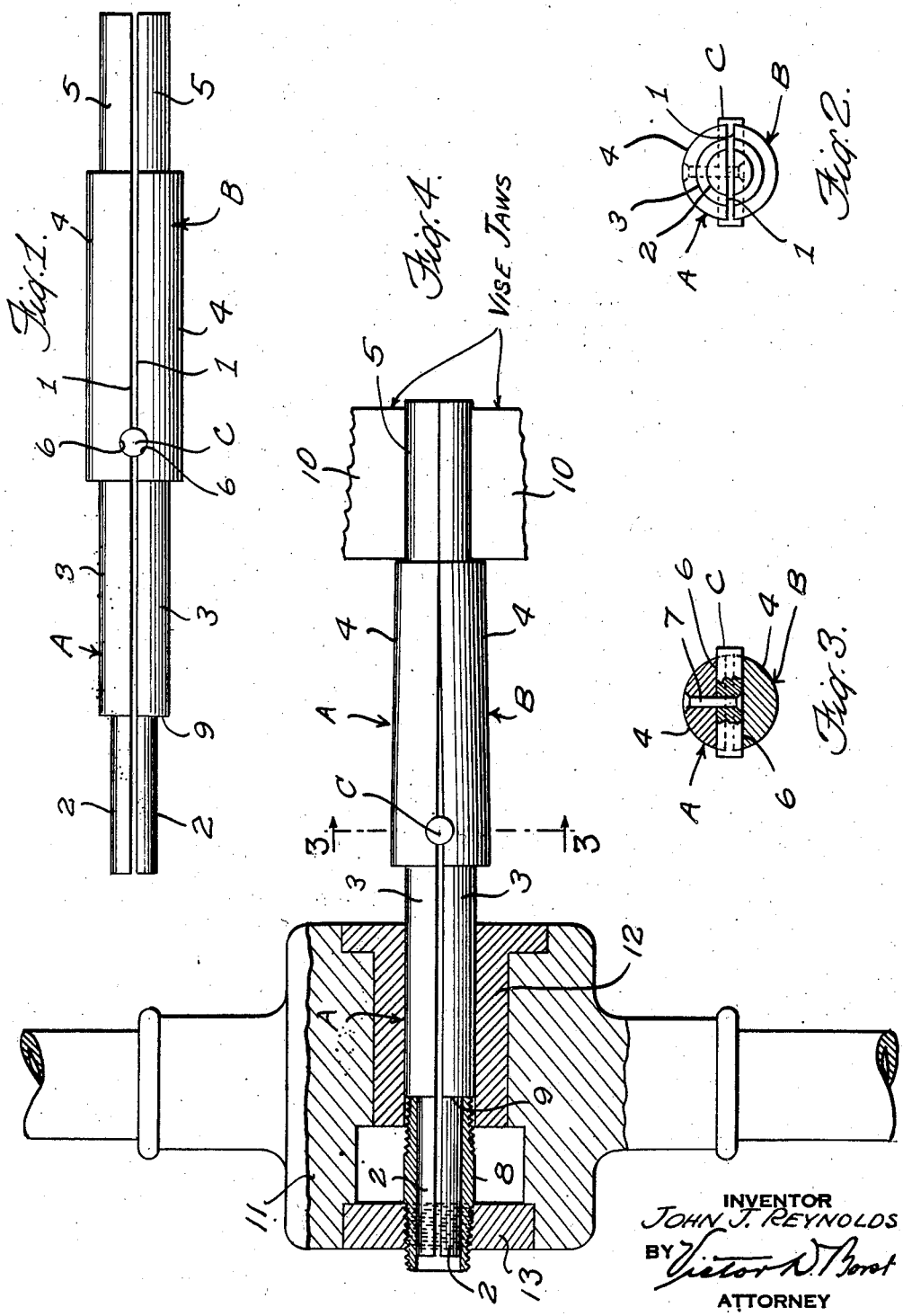
INVENTOR
JOHN J. REYNOLDS
BY
ATTORNEY Patented Feb. 18, 1947

2,416,220

UNITED STATES PATENT OFFICE 2,416,220

NIPPLE CHUCK

John J. Reynolds, East Orange, N. J.

Application February 15, 1946, Serial No. 647,799

5 Claims. (Cl. 279—2)

This invention relates to nipple chucks especially adapted for use in threading nipples on the job as they are needed.

In electrical conduit work and in plumbing the term nipple is used to denote a very short length of pipe or tubing which is externally threaded on both ends and is used to join two adjacent pipes or conduits. These nipples are usually threaded on the job with a standard thread cutting tool which consists of a stock or holder in which a thread cutting die and a collar are removably secured in axial alignment with each other. The interior diameter of the collar is the same as the exterior diameter of the pipe to be threaded and is relatively long as compared to the threading die. In operation, the collar which is positioned in advance of the threading die in the stock, rotatably supports the tool upon the pipe while the end thereof is being threaded.

In making nipples on the job the usual practice is to thread the end of a length of pipe which is held in a vise. The desired length of nipple is then cut off the pipe and the threaded end is then screwed into the interiorly threaded end of a larger pipe which is clamped in a vise and acts as a holder for the nipple during the threading of the other end thereof. Generally the end of the nipple projecting from the larger pipe acting as a holder is shorter than the length of the collar. This necessitates the removal from the stock of the collar just used and the insertion of another collar the interior diameter of which is the same as the exterior diameter of the larger pipe. This collar then rotatably supports the tool on the larger pipe during the threading of the other end of the nipple. This changing of collars each time a nipple is threaded consumes considerable time on a job. In some threading tools the collar and the threading die are made as a single unit. Threading tools of this type cannot be used for threading nipples in the manner above described.

The principal object of my invention is to provide a chuck which will enable the use of all types of tools in threading nipples and which will obviate the necessity of changing collars.

Another object of the invention is to provide a chuck of this character which can be used in threading different size nipples.

More limited objects of the invention will be apparent from the following specification and the accompanying drawing forming a part thereof wherein:

Fig. 1 is a plan view of a nipple chuck constructed in accordance with my invention;

Fig. 2 is an end elevation thereof looking from the left of Fig. 1;

Fig. 3 is a transverse section taken on the line 3—3 of Fig. 4; and

Fig. 4 is a sectional plan view showing the chuck in use.

Referring to the drawing by reference characters, my improved chuck consists of two opposed identical members A and B held in spaced relation to each other by a cylindrical pin C about which the members A and B may rock to a limited extent. The members A and B are disposed about a common axis and each member comprises a plane surface 1, extending from end to end thereof, and four sections 2, 3, 4 and 5 which are semicircular in cross section, the cross sectional area of each section being slightly less than the area of a semicircle. The cylindrical pin C is seated in two opposed semicircular recesses 6, extending transversely across the surfaces 1, with the axis of the pin C in the same plane as and perpendicular to the common axis of the members A and B. The pin C may be held in position by any suitable means such as a rivet 7 securing it to either one of the members A or B within the recess 6 thereof. The radius of each of the sections 2 is equal to one-half the inside diameter of one size pipe and the radius of each of the sections 3 is equal to one-half the outside diameter of that size pipe. The radius of each of the sections 5 is equal to one-half the inside diameter of another size pipe and the radius of each of the sections 4 is equal to one-half the outside diameter of that size pipe.

The manner in which my chuck is used in threading nipples will now be described, reference being had to Fig. 4 of the drawing. A nipple 8 is first cut to the desired length from a piece of pipe or tubing. Assuming that the diameter of the nipple is of the smaller of the two sizes each of my chucks is adapted to hold, it is placed about the sections 2 of the chuck with one end thereof abutting the shoulder 9 between the sections 2 and 3. The sections 5 of the chuck are then clamped tightly between the jaws 10 of a vise which draws the sections 5 together and urges the sections 2 outwardly into tight engagement with the inner wall of the nipple. As seen in Fig. 4 the outer wall of the nipple is then in alignment with the outer walls of the sections 3. The projecting end of the nipple is then threaded by a conventional threading tool which comprises a stock 11 in which are removably secured a collar 12 and a threading die 13 in axial alignment with each other. The collar 12 rotatably supports the tool upon the sections 3 during the cutting of the threads. The pressure of the vise is then released, and the nipple is removed from the chuck, turned end for end, and replaced on the chuck about the sections 2. The vise is again tightened up and the other end of the nipple is threaded, using the same die and collar.

If desired one end of the nipple may be threaded without the use of the chuck before it is cut to length from the pipe or tube, and then the other end threaded using the chuck as above described.

In threading a larger diameter nipple the sections 4 and 5 are used in the manner just described in connection with the use of the sections 2 and 3 when threading a smaller diameter nipple.

From the foregoing it will be apparent to those skilled in this art that I have provided a simple and efficient mechanism for accomplishing the objects of my invention, and it is to be understood that I am not limited to the specific construction shown and described as various modifications may be made thereto within the scope of the appended claims.

I claim:

1. In a nipple chuck for use in threading nipples having inside and outside diameters the combination of two identical members each of which includes two adjacent substantially semicylindrical sections, the radius of curvature of one section being equal to one-half the inside diameter of a nipple and the radius of curvature of the other section being equal to one-half the outside diameter thereof, and interengaging means between said identical members about which said members are adapted to rock.

2. In a nipple chuck for use in threading nipples having inside and outside diameters the combination of two adjacent sections having curved outer walls, the radius of curvature of the wall of one section being equal to one-half the internal diameter of a nipple and the radius of curvature of the wall of the other section being equal to one-half the outside diameter thereof, and interengaging means between said identical members about which said members are adapted to rock.

3. In a nipple chuck for use in threading nipples having inside and outside diameters the combination of two opposed identical members disposed about a common axis in spaced relation to each other, each of said members including two adjacent substantially semicylindrical sections, the radius of curvature of one section being equal to one-half the inside diameter of a nipple and the radius of curvature of the other section being equal to one-half the outside diameter thereof; and a transversely extending pivoting member about which said identical members are adapted to rock disposed between said identical members with the axis thereof perpendicular to the axis of said identical members.

4. In a nipple chuck for use in threading nipples having inside and outside diameters the combination of two opposed identical members disposed about a common axis in spaced relation to each other, each of said members including two adjacent sections, said sections being segments of cylinders of different diameters the diameter of one cylinder being equal to the inside diameter of a nipple and the diameter of the other cylinder being equal to the outside diameter thereof, a pivotal member about which said identical members are adapted to rock disposed between said identical members intermediate the ends thereof with the axis of said pivotal member perpendicular to the axis of said identical members.

5. In a nipple chuck for use in threading nipples having inside and outside diameters the combination of two identical members disposed about a common axis in spaced relation to each other, each of said members including; a substantially semicylindrical section at each end thereof, semicylindrical sections contiguous to each of said end sections, the radius of curvature of one end section being equal to one-half the internal diameter of one size nipple and the radius of curvature of the section contiguous to said one end section being equal to one-half the external diameter of said one size nipple, the radius of curvature of the other end section being equal to one-half the internal diameter of another size nipple and the radius of curvature of the section contiguous to said other end section being equal to one-half the external diameter of said other size nipple; and a transversely extending pivotal member about which said identical members are adapted to rock disposed between said identical members with the axis thereof perpendicular to the axis of said identical members.

JOHN J. REYNOLDS.

REFERENCES CITED

The following references are of record in the file of this patent:

UNITED STATES PATENTS

| Number | Name | Date |
| --- | --- | --- |
| 1,164,704 | Courembis | Dec. 21, 1915 |
| 202,768 | Vannan | Apr. 23, 1878 |
| 1,411,292 | Mueller | Apr. 4, 1922 |
| 459,933 | Lippert | Sept. 22, 1891 |
| 1,067,195 | Raithel | July 8, 1913 |